W. M. FOLBERTH.
WINDSHIELD CLEANER.
APPLICATION FILED AUG. 27, 1921. RENEWED AUG. 15, 1922.
1,438,229.
Patented Dec. 12, 1922.
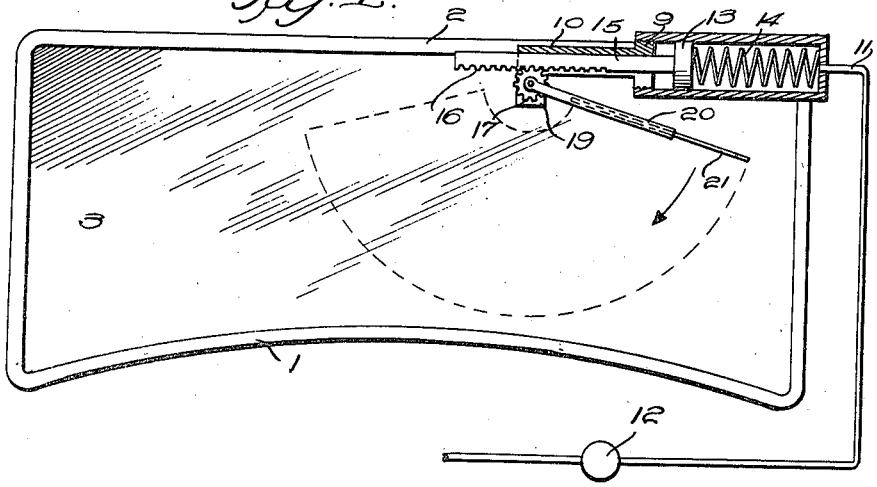
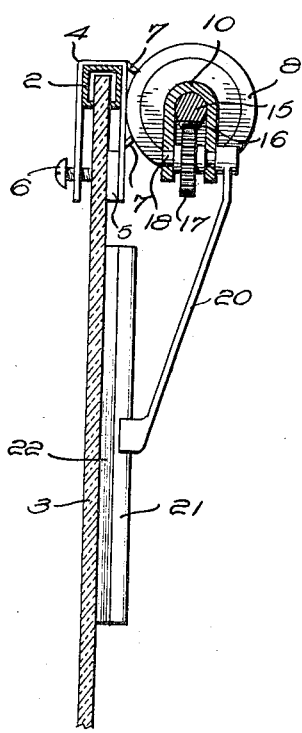
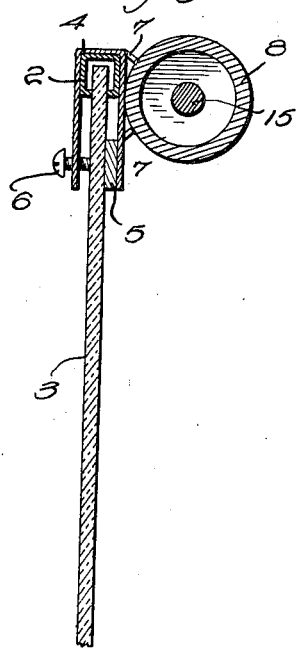
Inventor
W. M. Folberth
By
Attorney Patented Dec. 12, 1922.

1,438,229

UNITED STATES PATENT OFFICE.

WILLIAM MITCHEL FOLBERTH, OF CLEVELAND, OHIO, ASSIGNOR TO THE FOLBERTH AUTO SPECIALTY COMPANY, OF CLEVELAND, OHIO, A CORPORATION OF OHIO.

WINDSHIELD CLEANER.

Original application filed January 25, 1919, Serial No. 273,143. Divided and this application filed August 27, 1921, Serial No. 496,123. Renewed August 15, 1922. Serial No. 582,072.

*To all whom it may concern:*

Be it known that I, WILLIAM M. FOLBERTH, a citizen of the United States, residing at Cleveland, in the county of Cuyahoga and State of Ohio, have invented certain new and useful Improvements in Windshield Cleaners, of which the following is a specification.

This invention relates to windshield cleaners, and more particularly to a windshield cleaner adapted to be operated by a reciprocating piston. The present application is a division of my copending application Serial No. 273,143, filed January 25, 1919. In the said application, I have disclosed a motor operated windshield cleaner comprising a cylinder and piston adapted to be connected to the intake manifold of the engine to be operated by the suction within the engine to alternately place the opposite ends of the cylinder in communication with the manifold and reciprocate the piston. In the said application, I have broadly claimed the operation of a windshield cleaning element by the reciprocation of the piston.

The present application relates to oscillation of the cleaner element by the reciprocation of the piston. The cylinder containing the piston is adapted to be connected to the intake manifold to cause reciprocation of the piston and means are provided for converting the reciprocating movement of the piston to an oscillating movement of the cleaner element, whereby the cleaner element is swung back and forth in an arc of a circle over the windshield to remove water, mist, or other obstructing matter therefrom.

In the accompanying drawings, I have shown one embodiment of the invention. In this showing:

Figure 1 is a front elevation of a windshield showing the invention applied,

Figure 2 is a vertical sectional view through the piston rod, and,

Figure 3 is a similar view through the cylinder.

Referring to the drawings, the reference numeral 1 designates a windshield frame formed of suitable material and provided with a top 2. The frame is adapted to hold a windshield 3 formed of glass or other transparent material. The windshield cleaner is secured to the frame by means of a U-shaped bracket 4. One of the arms of the bracket is provided with a pad of cushioning material 5 adapted to engage the windshield, the other arm being provided with a set screw 6 by means of which the bracket is retained in position. One arm of the bracket is provided with a pair of lugs 7 adapted to engage a portion of cylinder 8, forming the motor of the windshield cleaner. The inner end of the cylinder is provided with a head 9 arranged therein in any suitable manner and having a substantially U-shaped guide 10 extending outwardly therefrom. The opposite end of the cylinder is provided with a head having an opening for the reception of a pipe 11, whereby the cylinder may be placed in communication with a suitable source of suction, such as the intake manifold of the engine. A valve 12 may be arranged in this pipe. A piston 13 is mounted within the cylinder and is normally held in outward position by means of a coil spring 14. The piston is provided with a piston rod 15 extending outwardly through the cylinder head 9 and within the guide 10. The piston rod is provided with a rack 16 formed thereon and adapted to mesh with a pinion 17 mounted on a shaft 18 carried by a pair of arms 19 extending downwardly from the U-shaped guide. This shaft is adapted to carry a cleaner rod 20 having a cleaner element 21 arranged thereon adapted to contact with the windshield. The cleaner rod 20 may be made of suitable resilient material to retain the cleaner element in engagement with the windshield. The cleaner element may be provided with a contacting strip 22 of rubber or other yielding material.

In operation, the valve 12 is alternately opened and closed by suitable means to create suction in the end of the cylinder and cause the piston to be moved against the action of the spring. When the valve is closed, and normal pressure established in the cylinder, the tension of the spring moves the piston in the opposite direction. The reciprocation of the piston causes the cleaner element to be oscillated due to the rack 16 and pinion 17.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a windshield cleaner, a cylinder, a bracket on which said cylinder is mounted, said bracket being adapted to be secured to a windshield frame, a piston mounted in said cylinder, said cylinder being connected to a source of suction to move said piston from a point adjacent one end of the cylinder to a point adjacent the opposite end the cylinder, a cleaner shaft, a cleaner element connected to said shaft and adapted to contact with the windshield, and means for oscillating the cleaner shaft by the movement of the piston.

2. In a windshield cleaner, a substantially air-tight casing, a bracket secured to said casing, said bracket being adapted to engage a windshield frame, an actuating member mounted in said casing, said casing being connected to a source of suction to move said actuating member from one position within the casing to a second position, a cleaner shaft, a cleaner element connected to said shaft and adapted to contact with the windshield, and means for oscillating the cleaner shaft by the movement of the actuating member.

3. In a windshield cleaner, a cylinder, a bracket secured to said cylinder, said bracket being adapted to engage a windshield frame, a piston mounted in said cylinder, said cylinder being connected to a source of suction, to move said piston from a point adjacent one end of the cylinder to a point adjacent the opposite end, a control valve arranged in said connection, a piston rod secured to the piston, a rack formed thereon, a cleaner shaft arranged adjacent the piston rod, a cleaner element connected to said shaft and adapted to engage the windshield, and a pinion mounted on said shaft and meshing with said rack to oscillate the cleaner shaft by the movement of the piston.

4. In a windshield cleaner, a substantially air-tight casing, said casing being adapted to be secured in operative position adjacent a windshield, an actuating member mounted in said casing, said casing being connected to a source of differential pressure to move said actuating member from one position within the casing to a second position, a cleaner shaft, a cleaner element connected to said shaft and adapted to contact with the windshield, and means for oscillating the cleaner shaft by the movement of the actuating member.

In testimony whereof I affix my signature in presence of two witnesses.

WILLIAM MITCHEL FOLBERTH.

Witnesses:
WILLIAM G. DEAS,
MAX F FOURNIER.